(12) United States Patent
Penha et al.

(10) Patent No.: US 9,665,263 B2
(45) Date of Patent: May 30, 2017

(54) SNAP NAVIGATION OF A SCROLLABLE LIST

(71) Applicant: Citrix Systems, Inc., Fort Lauderdale, FL (US)

(72) Inventors: Priscila K Penha, San Francisco, CA (US); Kelly May Nash, San Mateo, CA (US); Daisuke Sakurai, San Francisco, CA (US); Shih-Hao Yeh, San Francisco, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 382 days.

(21) Appl. No.: 14/247,866

(22) Filed: Apr. 8, 2014

(65) Prior Publication Data

US 2015/0286357 A1 Oct. 8, 2015

(51) Int. Cl.
*G06F 3/048* (2013.01)
*G06F 3/0485* (2013.01)
*G06F 3/0482* (2013.01)
*G06F 3/0488* (2013.01)

(52) U.S. Cl.
CPC .......... *G06F 3/0485* (2013.01); *G06F 3/0482* (2013.01); *G06F 3/04883* (2013.01)

(58) Field of Classification Search
CPC ... G06F 3/0485; G06F 3/0482; G06F 3/04883
See application file for complete search history.

(56) References Cited

U.S. PATENT DOCUMENTS

| | | | |
|---|---|---|---|
| 2006/0069604 A1* | 3/2006 | Leukart | G06Q 10/109 715/792 |
| 2011/0252362 A1 | 10/2011 | Cho et al. | |
| 2012/0036473 A1* | 2/2012 | Haseyama | G06F 3/016 715/784 |
| 2013/0111396 A1 | 5/2013 | Brid | |

FOREIGN PATENT DOCUMENTS

WO 2010138115 A1 12/2010

OTHER PUBLICATIONS

Dec. 2, 2014—(PCT) International Search Report—App PCT/US2014/033470.
Erica Ogg, Sunrise raise $2.2M to design a better mobile calendar, Gigaom, Jun. 4, 2013, 3 pages, https://gigaom.com/2013/06/04/sunrise-raises-2-2m-to-design-a-better-mobile-calendar.

\* cited by examiner

*Primary Examiner* — Peiyong Weng
(74) *Attorney, Agent, or Firm* — Banner & Witcoff, Ltd.

(57) ABSTRACT

Methods, systems, and computer-readable media for providing snap navigation in a scrollable list are presented. Certain items of the content items in the scrollable list may represent natural or desirable breakpoints for scrolling through the list. As a list view scrolls through the scrollable list in response to user input, the list view may suspend scrolling when it reaches a breakpoint content item. In some embodiments, a computing device may determine that a given content item represents a breakpoint in the scrollable list based on a breakpoint rule. The breakpoint rule may be based on any suitable criteria for identifying the content item as a breakpoint for scrolling the list. For example, the breakpoint rule may be based on the content of the content item or a category of the content item.

18 Claims, 9 Drawing Sheets

SNAP NAVIGATION OF A SCROLLABLE LIST

BACKGROUND

Aspects of the disclosure relate to computer hardware and software. In particular, one or more aspects of the disclosure generally relate to computer hardware and software for navigating a scrollable list.

Various kinds of computing devices, from personal computers to mobile devices, are becoming increasingly popular. In addition, people are increasingly using these devices for both business purposes and personal uses. As these devices continue to grow in popularity and people continue to use them for an ever-growing number of reasons, the users of these devices have demanded and will continue to demand greater convenience, functionality, and ease-of-use from their computing devices and the computer software with which they interact.

Lists of data are one kind of information that users of computing devices may access, and these lists may be used to represent a wide range of information. For example, a computing device may generate and present a list of content items such as a list of events on a calendar. However, these lists may be very long, and a user scrolling through these lists may find it difficult to navigate to important items in the list.

SUMMARY

Aspects of the disclosure relate to various systems and techniques that provide more convenient, functional, and easy-to-use ways for users to interact with user interfaces provided by computing devices and/or computer software, particularly in instances in which a user is accessing and/or otherwise interacting with a user interface that includes a scrollable list of content items. In addition, certain aspects of the disclosure may provide particular advantages when such a user interface is presented on a mobile device that includes a touch-sensitive display screen, such as a smart phone, tablet computer, or other type of touch-enabled mobile computing device.

A scrollable list is a useful and familiar way to provide one or more content items or list items to a user. In some embodiments discussed further herein, scrollable lists may be used in a wide range of applications, such as calendars, emails, task lists, event logs, catalogs, and the like. Throughout this disclosure, a scrollable list containing calendar items may be used as an example to illustrate features of this disclosure. However, the techniques and features described herein are not limited to calendar data and are generally applicable to any type of content or data that may be included in a scrollable list.

Some aspects described herein may provide a method and system for providing snap navigation of a scrollable list. Certain items of the content items in the scrollable list may, for instance, represent natural or desirable breakpoints for scrolling through the list. For example, scrolling could stop at the end of each day in a list of calendar items or at critical events in an event log. As a list view generated by an application or a computing device scrolls through the scrollable list in response to user input, scrolling in the list view may be suspended when it reaches a breakpoint content item. According to some aspects discussed herein, the computing device may determine that a given content item represents a breakpoint in the scrollable list based on a breakpoint rule. The breakpoint rule may be based on any suitable criteria for identifying the content item as a breakpoint for scrolling the list. In some embodiments, the breakpoint rule may be based on whether the content item is a first or last item of a logical grouping of content items in the scrollable list. In some embodiments, the breakpoint rule may be based on whether content and/or attributes of the content item meet some breakpoint criteria.

Aspects of the disclosure may provide a method that includes generating, by a computing device, a user interface presenting a list view of a scrollable list that includes a plurality of content items. The list view may include a first portion of the plurality of content items. The computing device may receive user input corresponding to a first scroll command. Based on the first scroll command, the computing device may update the list view to scroll through the plurality of content items, thereby including a first additional content item of the plurality of content items in the list view. The computing device may determine whether the first additional content item satisfies a breakpoint rule and, when it is determined that the first additional content item satisfies the breakpoint rule, the computing device may suspend further updates to the list view that are based on the first scroll command.

In some embodiments, when presenting the list view, the computing device may continue to scroll through the scrollable list when the first additional content item does not satisfy the breakpoint rule.

In some embodiments, suspending updates that are based on the first scroll command may comprise updating the list view to scroll past the first additional content item, presenting at least a portion of a second content item adjacent to the first additional content item in the scrollable list, and removing the second content item by scrolling back to the first additional content item. The computing device may receive user input corresponding to a second scroll command after suspending updates based on the first scroll command, and the computing device may update the list view to scroll through second additional content items of the scrollable list.

In some embodiments, determining whether the first additional content item satisfies the breakpoint rule may be based on content data associated with the first additional content item, and whether the content matches a defined value or threshold. In some embodiments, the scrollable list may be divided into a plurality of segments and the breakpoint rule may be satisfied where the first additional content item is a beginning item or an end item of a segment. The segments may correspond to a respective time period, and the scrollable list may be divided into the plurality of segments based on a date or time associated with each of the plurality of content items. The scrollable list may be divided into the plurality of segments based on user-defined criteria.

In some embodiments, the user interface may include an index region generated based on the plurality of content items of the scrollable list. The index region may include an indicator, and the indicator may be updated based on scrolling activity in the list view. The computing device may receive user input selecting a portion of the index, and the list view may be updated to present a portion of the scrollable list based on the selected portion of the index. In some embodiments the index may comprise a calendar date picker.

Aspects of the disclosure may provide another method including retrieving, by a computing device, a scrollable list that includes a plurality of content items. The method may include generating a user interface presenting a list view of the scrollable list, and the list view comprising a display area including a portion of the plurality of content items. The computing device may receive user input corresponding to a first scroll command. Based on the first scroll command, the list view may be updated to scroll through the plurality of content items by including additional content items of the plurality of content items on the list view. The computing device may determine that the scrolling crosses a first content item of the additional content items, wherein the first content item satisfies a breakpoint rule. Based on determining that the scrolling crosses the first content item, the list view may be updated to: scroll past the first content item; present at least a portion of a second content item of the plurality of content items, the second content item adjacent to the first content item in the scrollable list; and after presenting the second content item, cause the second content item to be automatically hidden by scrolling back to the first content item.

In some embodiments, the computing device may update the list view to scroll past the first content item based on receiving user input initiating a second scroll command while the first content item is included on the list view. The scrollable list may be divided into a plurality of segments based on user-defined criteria, and determining whether the first content item satisfies the breakpoint rule may be based on determining whether the first content item represents a beginning item or an end item of a segment of the plurality of segments.

In some embodiments, the scrollable list may be retrieved prior to receiving the user input corresponding to the first scroll command, and the retrieved scrollable list may include the additional content items and the second content item.

In some embodiments, the scrollable list may comprise an event log or a streaming data feed. In others, the scrollable list may comprise email messages or tasks in a task list.

Aspects of the disclosure may provide a system comprising a processor and memory, and the memory may include instructions that cause the system to generate a user interface presenting a list view of a scrollable list that includes a plurality of content items, wherein the list view includes a first portion of the plurality of content items. The system may receive user input corresponding to a first scroll command, wherein the first scroll command corresponds to a scrolling motion. Based on the first scroll command, the system may update the list view to scroll through the plurality of content items, thereby including a first additional content item of the plurality of content items in the list view. The system may determine whether the first additional content item satisfies a breakpoint rule based on a value associated with the first additional content item. When it is determined that the first additional content item satisfies the breakpoint rule, the system may suspend further updates that are based on the first scroll command. Suspending further updates based on the first scroll command may comprise scrolling past the first additional content item, presenting at least a portion of a second additional content item adjacent to the first additional content item in the scrollable list, and automatically hiding the second additional content item by scrolling back to the first additional content item in the list. When it is determined that the first additional content item does not satisfy the breakpoint rule, the system may update the list view to continue scrolling based on the first scroll command through the plurality of content items, thereby including a second additional content item of the plurality of content items in the list view.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
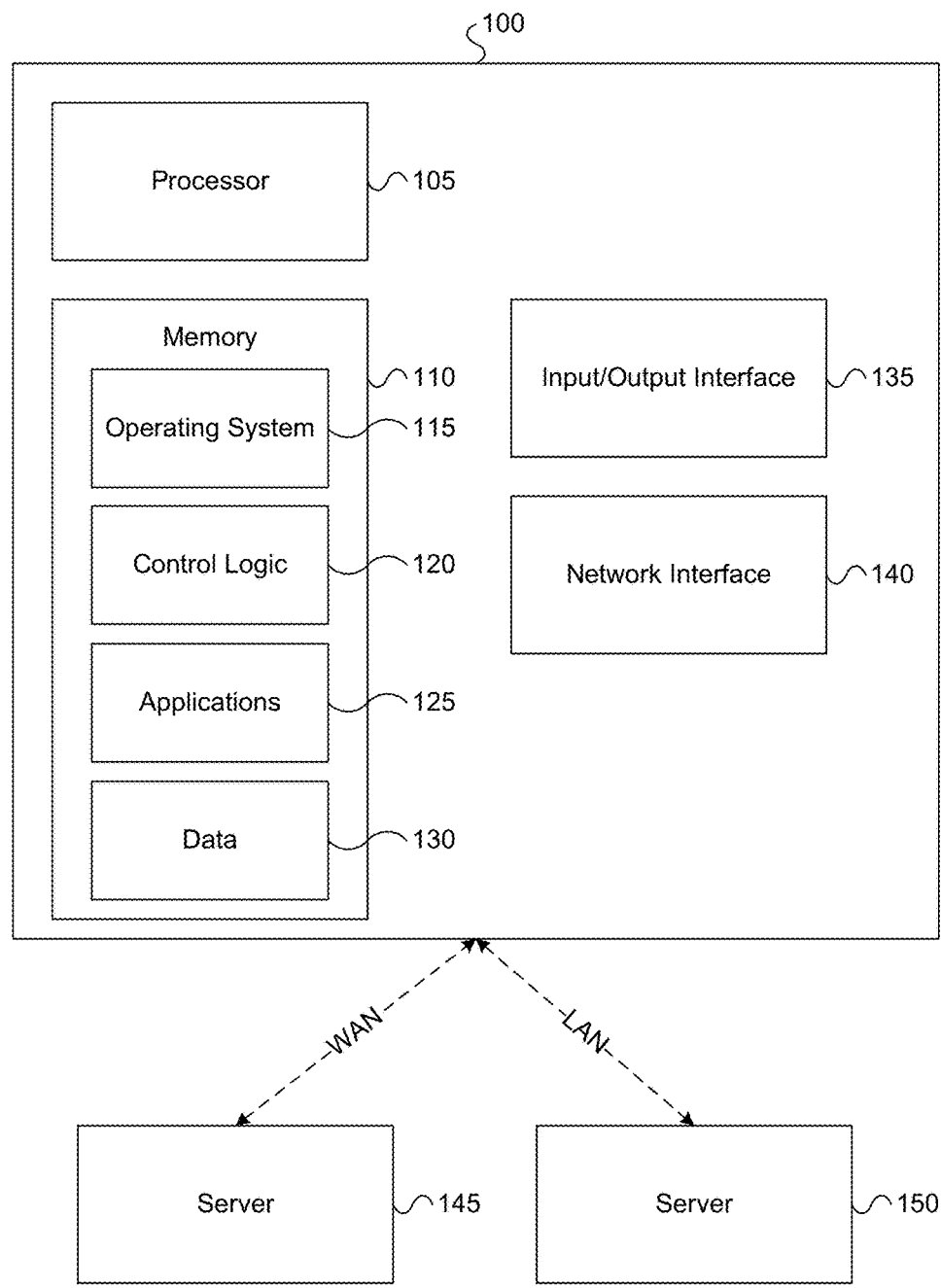
FIG. 1 depicts an example of a computing device that may be used in implementing one or more aspects of the disclosure in accordance with one or more illustrative aspects discussed herein.

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

A scrollable list is a useful and familiar way to provide one or more content items or list items to a user. In some embodiments discussed further herein, scrollable lists may be used in a wide range of applications, such as calendars, emails, task lists, event logs, catalogs, and the like. A scrollable list may contain a limited number of content items, such as where the scrollable list contains information relating to a catalog of categorized items. Alternatively, the scrollable list may be infinite or contain an unlimited number of items, such as where the scrollable list contains information related to a user's calendar or schedule, or where the scrollable list contains information related to an ongoing event log. Throughout this disclosure, a scrollable list containing calendar items may be used as an example to illustrate features of this disclosure. However, the techniques and features described herein are not limited to calendar data and are generally applicable to any type of content or data that may, for example, be included in a scrollable list.

Each content item of the scrollable list may include content data and/or one or more attributes. As one example, the content item may have content data such as a value or name associated with the content item, and may have attributes such as a category and importance of the content item. The content data and attributes may themselves contain additional content data and/or attributes. For example, a location attribute associated with the content item may have a content data value of "office." The content items, in some embodiments, may be sorted, grouped, and/or filtered based on the content data and/or attributes of the content items. For example, a catalog of products may be sorted to include content items in ascending order based on price, or may group items in the scrollable list according to a category attribute. As another example, a list of calendar items may be sorted by date and start time, and events with a "personal" attribute may be removed by a filter.

The scrollable list may be presented as part of a user interface through a list view. The list view may be a graphical representation of the scrollable list, and may include a portion of the content items in the scrollable list. The list view may include some or all of the content data and/or attributes associated with each content item included in the list view. The content items in the list view may be operable in response to user input to provide the user with additional information associated with the content item. For example, a user may tap or click on a calendar item and the user interface may provide the user with details about an event associated with the calendar item. The list view may include additional items other than the content items of the scrollable list. For example, the list view may include headings and/or separators grouping the content items into logical segments. In some embodiments, the list view may further include controls to allow a user to sort, group, filter, or otherwise rearrange the content items of the scrollable list. The list view may allow a user to scroll through the content items of the scrollable list. Based on received user input corresponding to a scrolling motion, the list view may be updated to include additional content items of the scrollable list.

Some aspects disclosed herein may provide a method and system for providing snap navigation of a scrollable list. Certain items of the content items in the scrollable list may represent natural or desirable breakpoints for scrolling through the list. For example, scrolling may stop at the end of each day in a list of calendar items or at critical events in an event log. As a list view generated and/or presented by an application or computing device scrolls through the scrollable list in response to user input, scrolling in the list view may be suspended when it reaches a breakpoint content item. According to some aspects discussed herein, the computing device may determine that a given content item represents a breakpoint in the scrollable list based on a breakpoint rule. The breakpoint rule may be based on any suitable criteria for identifying the content item as a breakpoint for scrolling the list. In some embodiments, the breakpoint rule may be based on whether the content item is a first or last item of a logical grouping of content items in the scrollable list. For example, where the scrollable list comprises calendar items, the breakpoint rule may comprise determining whether the content item is the last calendar item of a day. In some embodiments, the breakpoint rule may be based on determining whether content and/or attributes of the content item meet some breakpoint criteria. For example, where the scrollable list comprises a sporting event log, the breakpoint rule may comprise determining whether the content item is a goal or other scoring event. As another example, the breakpoint rule may be based on whether an importance attribute of the content item meets a threshold importance level. As yet another example, the breakpoint rule may be based on whether the content of the content item includes keywords or otherwise matches predefined and/or user-defined criteria.

Aspects of the disclosure may be equally applied moving forwards/backwards and/or up/down through the list. For example, a content item that is the first item in a logical segment of the scrollable list may be identified as satisfying a breakpoint rule, and an upwards scroll command through the list may be suspended based on the first item in the logical segment. Similarly, though the discussion above may refer to snapping "forward" or "ahead" to a "next" logical segment, the same techniques apply for snapping to a "previous" logical segment.

As noted above, certain embodiments are discussed herein that relate to providing snap navigation of a scrollable list. Before discussing these concepts in greater detail, however, several examples of a computing device that may be used in implementing and/or otherwise providing various aspects of the disclosure will first be discussed with respect to FIG. 1.

FIG. 1 depicts an example of a computing device 100 that may be used in implementing one or more aspects of the disclosure in accordance with one or more illustrative aspects discussed herein. For example, computing device 100 may, in some instances, implement one or more aspects of the disclosure by reading and/or executing instructions and performing one or more actions accordingly. In one or more arrangements, computing device 100 may represent, be incorporated into, and/or include a desktop computer, a computer server, a mobile device (e.g., a laptop computer, a tablet computer, a smart phone, any other type of mobile computing device, etc.), and/or any other type of data processing device. Computing device 100 may, in some instances, operate in a standalone environment. In other instances, computing device 100 may operate in a networked environment. For example, computing device 100 may, in some instances, be connected to and/or otherwise in communication with one or more other computing devices that may be local to and/or physically remote from computing device 100.

As seen in FIG. 1, computing device 100 may, in some embodiments, include a processor 105, memory 110, an input/output interface 135, and a network interface 140. These are only some examples of the components and/or subsystems that may be included in computing device 100 in some embodiments. In other embodiments, computing device 100 may include two or more of any and/or all of these components (e.g., two or more processors, two or more memories, etc.) and/or other components and/or subsystems not listed here.

In some embodiments, processor 105 may control overall operation of computing device 100, including operation of one or more of the other components included in computing device 100, such as memory 110, input/output interface 135, and/or network interface 140. Memory 110 may, for instance, store software, instructions, data, and/or other information. For example, software may be stored in memory 110 and/or other storage to provide instructions to processor 105 for configuring the generic computing device 100 into a special purpose computing device in order to perform one or more of the various functions discussed herein.

In some arrangements, memory 110 may store, provide, and/or otherwise include an operating system 115, control logic 120, one or more applications 125, and/or data 130. Operating system 115 may, for example, control overall operation of computing device 100. Control logic 120 may, for instance, instruct computing device 100 and/or various components included therein, including processor 105, to perform and/or otherwise provide various aspects of the disclosure. The one or more applications 125 may, for example, provide secondary, support, and/or other functionalities that may be used in conjunction with various aspects of the disclosure. Additionally, data 130 may, for instance, be used in performing one or more aspects of the disclosure and, in some instances, may include one or more databases, data tables, and/or the like.

In some arrangements, input/output interface 135 may include a keyboard, mouse, display, printer, scanner, optical reader, stylus, and/or one or more other components. For example, input/output interface 135 may include various interface units and/or drives for reading, writing, displaying, and/or printing files and/or other data. In some embodiments, input/output interface 135 may include an audio interface that includes one or more microphones for capturing audio input and/or one or more speakers for providing audio output. Additionally or alternatively, input/output interface 135 may include a video display device for providing textual, audiovisual, and/or graphical output.

In some embodiments, at least one display included in and/or otherwise provided by input/output interface 135 may be a touch-sensitive display screen (also known as a "touch screen"). Such a touch screen may, for instance, be configured to display graphical content rendered and/or otherwise generated by computing device 100. In addition, the touch screen may be configured to receive user input from a user of computing device 100, including touch-based user input provided by the user using a stylus, finger, or other pointing aspect that is operated, controlled, and/or otherwise used by the user of the computing device 100 to interact with the touch screen.

As indicated above, computing device 100 may, in some instances, operate in a networked environment supporting connections to one or more remote computers, servers, and/or devices. Such connectivity may, in some embodiments, be provided by network interface 140. For example, network interface 140 may include one or more communication interfaces, ports, adapters, antennas, and/or other elements to facilitate various network connections. Such network connections may include local area network (LAN) connections, wide area network (WAN) connections (e.g., to the Internet), and/or any other types of connections. In some arrangements, LAN connections may be established and/or provided via a dedicated LAN interface and/or adapter, and/or WAN connections may be established and/or provided via a dedicated WAN interface and/or adapter. Other connections may, for example, be established and/or provided via other communication interfaces, such as wired communication interfaces (e.g., Ethernet), wireless communication interfaces (e.g., wireless LAN (WLAN), cellular, Bluetooth, etc.), and/or other communication interfaces.

As seen in FIG. 1, computing device 100 may, in some instances, be connected to and/or in communication with one or more servers, such as server 145 and server 150. Such servers may, for instance, implement one or more aspects of computing device 100 and, accordingly, may include one or more processors, memories, and/or the like. Some connections to the one or more servers may be established via a LAN (e.g., the connection between computing device 100 and server 145), while other connections to the one or more servers may be established via a WAN (e.g., the connection between computing device 100 and server 150). In some embodiments, some or all of the one or more servers may be virtual servers that are provided by software being executed on one or more computing devices.

In addition, one or more aspects of the disclosure may be embodied in computer-usable or readable data and/or computer-executable instructions, such as in one or more program modules, executed by one or more computers or other devices as discussed herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as discussed herein may be transferred between a source and a destination in the form of electromagnetic waves traveling through signal-conducting media such as metal wires, optical fibers, and/or wireless transmission media (e.g., air and/or space). Various aspects discussed herein may be embodied as a method, a data processing system, or a computer program product. Therefore, various functionality may be embodied in whole or in part in software, firmware, and/or hardware or hardware equivalents such as integrated circuits, field programmable gate arrays (FPGA), and the like. Particular data structures may be used to more effectively implement one or more aspects of the disclosure, and such data structures are contemplated as being within the scope of computer executable instructions and computer-usable data discussed herein.

Further, some aspects of the disclosure may also be operational with numerous other general purpose or special purpose computing system environments or configurations. Examples of other computing systems, environments, and/or configurations that may be suitable for use with aspects discussed herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Having discussed several examples of the computing system architecture that may be used in providing and/or implementing various aspects of the disclosure, a number of embodiments will now be discussed in greater detail. In particular, and as introduced above, some aspects of the disclosure generally relate to providing user interfaces for snap navigation in scrollable lists. In the description below, various examples illustrating how such user interfaces may be provided in accordance with one or more embodiments will be discussed.

Figure 2:
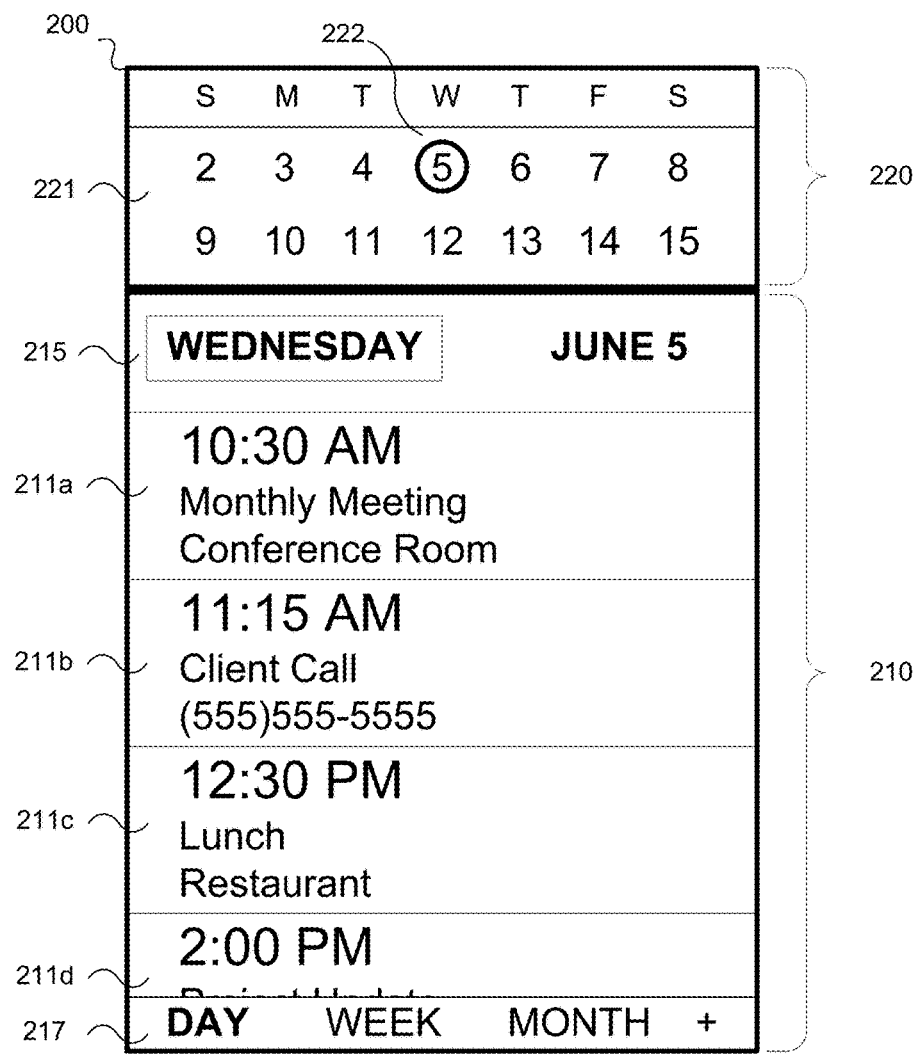
FIG. 2 depicts an example user interface that includes a representation of a scrollable list in accordance with one or more illustrative aspects discussed herein.

FIG. 2 illustrates an example user interface 200 presenting a list view 210 of a scrollable list containing calendar items. User interface 200 may be generated by and/or presented by a computing device, such as computing device 100. User interface 200 may be provided to a display by computing device 100 for output to a user. As discussed above, aspects of the disclosure herein are not limited to a scrollable list of calendar items, and the scrollable list may include any suitable types of content items. In the example illustrated in FIG. 2, the scrollable list may contain calendar items corresponding to events, meetings, appointments, and the like on a calendar. List view 210 includes calendar items 221*a*, 211*b*, 211*c*, and 211*d*. Each calendar item may have content and/or various attributes associated with it. For example, calendar item 211*a* has an event time attribute with a value of 10:30 AM, a name or title attribute with a value "Monthly Meeting," and a location attribute with a value "Conference Room." Calendar item 211*a* may have additional content data and/or attributes, and list view 210 may include some or all of these additional attributes if desired.

In some embodiments, list view 210 may also include headings such as heading 215. Headings may be generated and/or insert into list view 210 to identify categories or other groups of the content items of the scrollable list. The headings may persist even while the user scrolls through content items in a group to provide a user with an indication of the category currently presented in list view 210. Heading 215 identifies a date and a day of the week associated with a calendar items 211*a-d* as presented in the list view. In some embodiments, a grouping control 217 may be provided as part of or in addition to list view 210. Grouping control 217 may respond to user input and sort, group, filter, and/or otherwise rearrange content items of the scrollable list. For example, grouping control 217 may allow the user to group items by day, week, or month. Responsive to a user selecting the monthly portion of grouping control 217, the calendar items in the scrollable list may be grouped by a month associated with each respective calendar item. Heading 215 may be updated to reflect the new grouping, such as by changing to indicate "June." Although not illustrated in FIG. 2, grouping control 217 may include other controls to sort and/or filter the scrollable list. Other controls may also be included in user interface 200 to provide additional functionality and control to a user.

In some embodiments, user interface 200 may include an index portion 220. Index portion 220 may comprise an index or other navigational aid related to the scrollable list. For example, index portion 220 as illustrated in FIG. 2 may include a calendar date picker 221. Calendar date picker 221 may indicate to a user a current date displayed in the list view using indicator 222. As the list view scrolls through the scrollable list, indicator 222 may be updated to show the current location in the scrollable list. For example, if a user scrolls user interface 200 of FIG. 2 down to a next day, June 6, indicator 222 may shift to the right to indicate that June 6 is currently presented in list view 210. Thus, indicator 222 and index portion 220 may be updated in response to scrolling activity in the list view. Additionally and/or alternatively, user input received in index portion 220 selecting an entry or other part of index portion 220 may cause list view 210 to jump in the scrollable list to a portion of the scrollable list associated with the selected entry. For example, if a user were to select "8" in date picker 221, list view 210 may jump in the scrollable list to display events occurring on June 8 and indicator 222 may be relocated to "8" in date picker 221.

Figure 3:
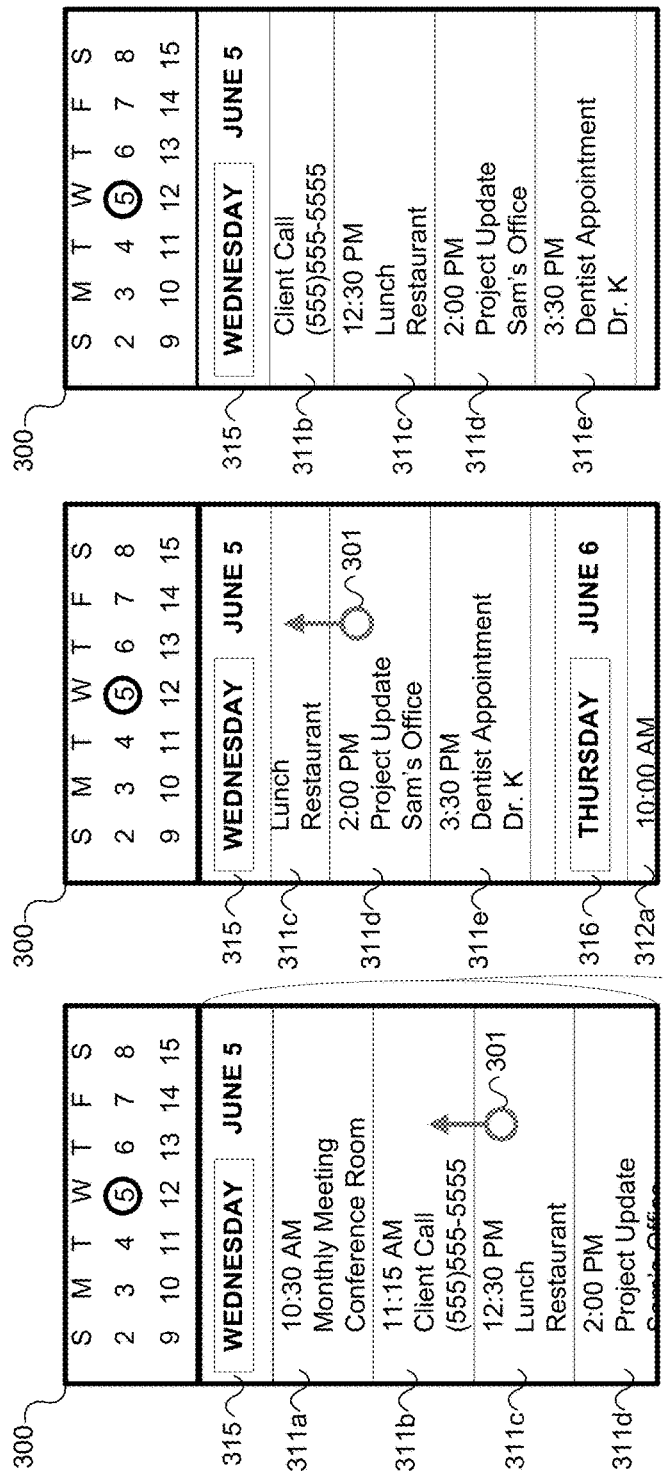
FIGS. 3A-3C depict example user interfaces as well as illustrative user input in accordance with one of more aspects discussed herein.

FIGS. 3A-3C illustrate how a user interface 300 similar to user interface 200 of FIG. 2 may response to user input according to one or more aspects disclosed herein. User interface 300 may be generated and/or provided by a computing device such as computing device 100. User interface 300 of FIG. 3A may generally correspond to user interface 200, list view 310 may correspond to list view 210, content items 311*a-d* may correspond to calendar items 211*a-d*, and heading 315 may correspond to heading 215. User interface 300 includes a list view 310 presenting content items, such as calendar items 311*a-d*. The computing device may receive user input, such as user input 301. User input 301 may correspond to a scrolling motion. For example, user input 301 may comprise a user touching a touchscreen of the computing device and dragging their finger in an upward direction. As another example, user input 301 may comprise a user operating a pointing device or otherwise interacting with a scrollbar associated with list view 310. As yet another example, user input 301 may comprise operation of a physical or software button or key associated with scrolling, such as a scroll wheel or arrow key.

In response to receiving user input 301, the computing device may update list view 310 to scroll through the scrollable list by updating list view 310 to include additional content items of the scrollable list. For example, list view 310 may be updated to include additional calendar item 311*e* as illustrated in FIG. 3B. Additional calendar item 311*e* may be a content item in the scrollable list that follows, precedes, and/or is subsequent to calendar item 311*d*, based on a direction associated with user input 301. An order of items in the scrollable list may be determined by any suitable criteria based on content data and/or attributes of the content items, such as a chronological order, alphabetical order, ordering based on data categories, creation order, specified ordering, user-defined order, and/or any appropriate criteria for determining an order of the content items in the scrollable lists. In some embodiments, the content items may be randomly sorted in the scrollable list. Responsive to receiving user input 301, list view 310 may be updated to include additional content item 311*e*.

The computing device may determine whether calendar item 311*e* satisfies a breakpoint rule. If calendar item 311*e* satisfies the breakpoint rule, the computing device may suspend a response to a scroll command associated with or based on user input 301, and list view 310 may stop scrolling at calendar item 311*e* until further input is received. Determining whether a content item satisfies a breakpoint rule may be based on any suitable criteria for identifying the content item as a breakpoint for scrolling the list. In some embodiments, the breakpoint rule may be based on whether the content item is a first or last item of a logical grouping of content items in the scrollable list. In the example illustrated in FIGS. 3A-3C, where the scrollable list comprises calendar items, the breakpoint rule may comprise determining whether the content item is the last calendar item of a day. In some embodiments, the breakpoint rule may be based on whether content and/or attributes of the content item meet some breakpoint criteria. For example, where the scrollable list comprises a sporting event log, the breakpoint rule may comprise determining whether the content item is a goal or other scoring event. As another example, the breakpoint rule may comprise determining whether an importance attribute of the content item meets a threshold importance level. As yet another example, the breakpoint rule may be based on whether the content of the content item includes keywords or otherwise matches predefined and/or user defined criteria.

Based on determining that the content item satisfies a breakpoint rule, the computing device may suspend or terminate a response to the scrolling action associated with user input 301. The computing device may effect the suspension or termination of the scrolling action in a variety of ways. In some embodiments, the computing device may stop updating list view 310 responsive to user input 301 after calendar item 311e is included in the list view 310. The computing device may then wait until further input is received or it is otherwise determined that list view 310 should be scrolled or updated further. In such a case, list view 310 may advance through the scrollable list of calendar items, reach calendar item 311e, and cease scrolling operations (based on user input 301). List view 310 may continue scrolling through the scrollable list in response to other, additional, user input different from user input 301.

In other embodiments, the computing device may provide a "peek" or a preview of one or more content items following the breakpoint content item (e.g., calendar item 311e), and then snap or bounce list view 310 back to the breakpoint content item. As illustrated in FIG. 3B, calendar item 311e has been included in list view 310 responsive to user input 301. The computing device may determine that calendar item 311e satisfies a breakpoint rule and that scrolling actions based on user input 301 should be suspended. The computing device may update list view 310 to provide a preview of one or more additional content items following the breakpoint content item in the scrollable list. As illustrated in FIG. 3B, calendar item 312a may be at least partially included in list view 310. This may be useful to indicate to the user that additional data follows the breakpoint content item. Further headings, such as heading 316, may be included in the preview if appropriate. For example, in FIG. 3B a heading 316 is included in list view 310 to show that calendar item 312a occurs on a different day.

After providing the "peek" or preview of one or more additional content items (e.g., calendar item 312a) following the breakpoint content item (e.g., calendar item 311e) in the scrollable list, list view 310 may be updated to remove the additional content items. In some embodiments, the computing device may update list view 310 to scroll back to calendar item 311e, such that calendar item 312a is no longer included in list view 310. In some embodiments, a snap-back or a bounce-back animation may be used to present the operation to the user. List view 301 may be updated to provide a preview of additional calendar item 312a and other calendar items based on the computing device continuing to receive user input 301, such as where the user continues to drag upwards without removing their finger or stylus. Once user input 301 ends, in some embodiments, list view 310 may snap back to the breakpoint content item. This may provide a fluid and dynamic response to user input 301. In other embodiments, list view 310 may snap or bounce back to the breakpoint content item after the preview has been included for a short period of time, such as a period less than half a second.

FIG. 3C illustrates user interface 300 after a response to user input 301 has been suspended or terminated. List view 310 may be scrolled back or otherwise set to include calendar item 311e and remove calendar item 312a. As a result of user input 301, the computing device has updated list view 310 to scroll through the scrollable list and include calendar item 311e. This scrolling action, as illustrated in FIG. 3C, may have resulted in calendar item 311a being removed from list view 310 as it is scrolled off a top of the view. Thus, a response to a user's scrolling action may result in scrolling through a list until a breakpoint is reached. The response to the scrolling action may be stopped based on recognizing the breakpoint. This may improve a user's experience and comprehension when scrolling through a scrollable list of content items.

Figure 4:
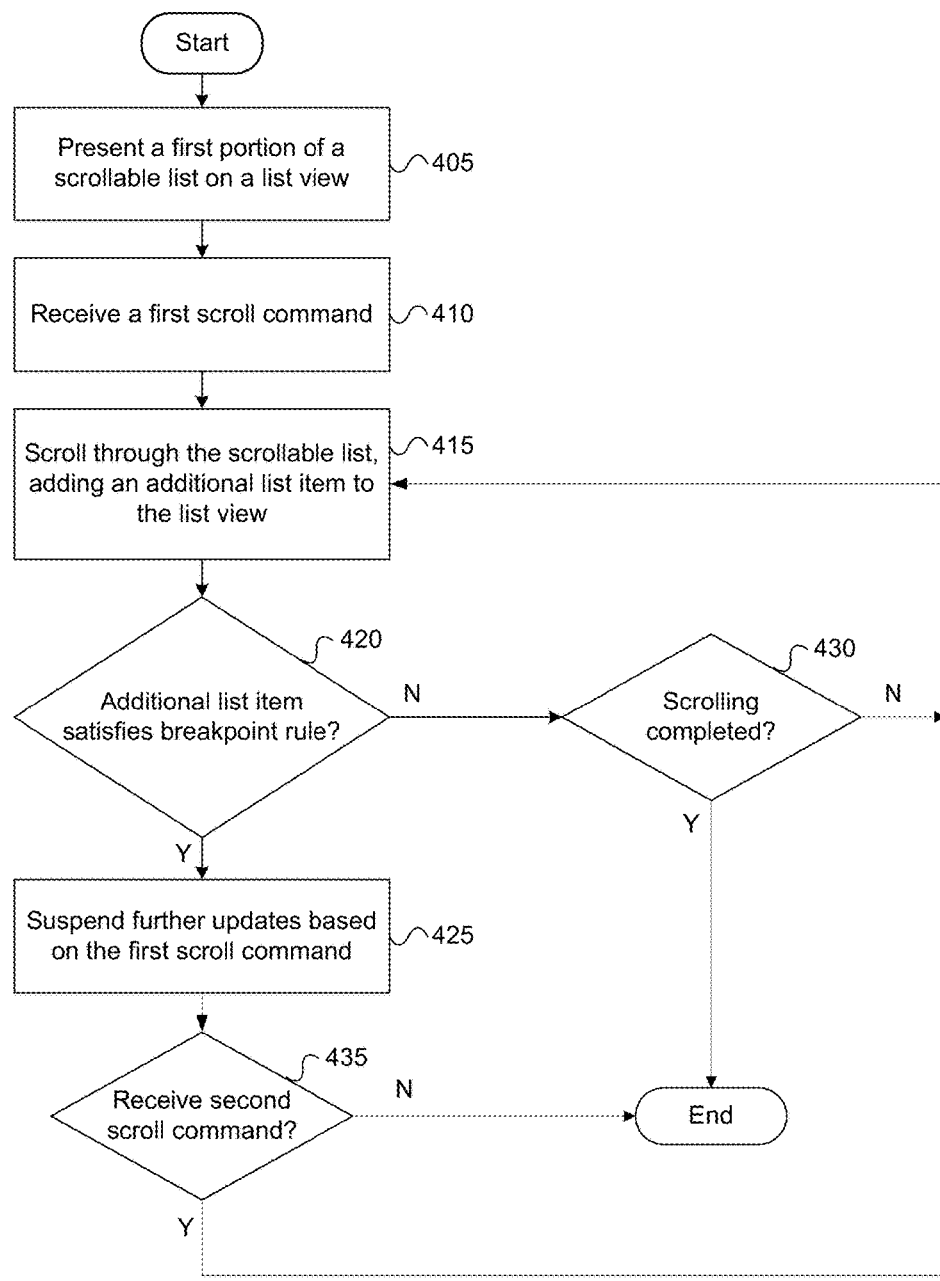
FIG. 4 depicts a flowchart that illustrates a method of navigating a scrollable list in accordance with one or more illustrative aspects discussed herein.

Having discussed a user interface according to FIGS. 2 and 3A-3C, discussion will now turn to a method of providing snap navigation in a scrollable list as shown in FIG. 4.

FIG. 4 depicts a flowchart that illustrates a method of providing snap navigation in a scrollable list in accordance with one or more illustrative aspects discussed herein. In one or more embodiments, the method illustrated in FIG. 4 and/or one or more steps thereof may be performed by a computing device (e.g., generic computing device 100). Additionally or alternatively, the method illustrated in FIG. 4 and/or one or more steps thereof may, in some instances, be performed by a mobile device (which may implement one or more aspects of a computing device, such as generic computing device 100). In other embodiments, the method illustrated in FIG. 4 and/or one or more steps thereof may be embodied in computer-executable instructions that are stored in a computer-readable medium, such as a non-transitory computer-readable memory.

As illustrated in FIG. 4, the method may begin at step 405 in which the computing device may generate and/or provide a user interface including a list view of a scrollable list. The list view may present a first portion of a plurality of list or content items in the scrollable list. The user interface and the list view may be similar to user interface 200 and list view 210 (FIG. 2), for instance, and the first portion of the plurality of list or content items in the scrollable list may be similar to calendar items 211a-d.

In step 410, the computing device (e.g., computing device 100) may receive user input corresponding to a first scroll command. For example, the computing device may receive such user input via a mouse, touch screen, keyboard, and/or the like. For example, the user input may comprise a user touching a touchscreen of the computing device and dragging their finger in an upward direction. As another example, the user input may comprise a user operating a pointing device or otherwise interacting with a scrollbar associated with the list view. As yet another example, the user input may comprise operation of a physical or software button or key associated with scrolling, such as a scroll wheel or arrow key.

In step 415, the computing device may update the list view to scroll through the scrollable list by updating the list view to include additional list items of the scrollable list. For example, the list view may be updated to include an additional list item. The additional list item may be a content item in the scrollable list that follows, precedes, and/or is subsequent to a list item already included in the list view. An order of items in the scrollable list may be determined using any suitable criteria based on content data and/or attributes of the content items, such as a chronological order, alphabetical order, ordering based on data categories, creation order, specified ordering, user-defined order, and/or any appropriate criteria for determining an order of the content items in the scrollable lists. Responsive to receiving the first scroll command, the computing device may update the list view to include the additional list item.

In step 420, the computing device may determine whether the additional list item satisfies one or more breakpoint rules. Determining whether a content item satisfies a breakpoint rule may be based on any suitable criteria for identifying the content item as a breakpoint for scrolling the list. In some embodiments, the breakpoint rule may be based on whether the content item is a first or last item of a logical grouping of content items in the scrollable list. In some embodiments, the breakpoint rule may be based on whether content and/or attributes of the content item meet some breakpoint criteria.

As another example, the breakpoint rule may be based on whether an importance attribute of the content item meets a threshold importance level. As yet another example, the breakpoint rule may be based on whether the content of the content item includes keywords or otherwise matches predefined and/or user defined criteria.

If the additional list item does not satisfy a breakpoint rule, the method may proceed to step 430. In step 430, the computing device may determine whether scrolling is completed in response to the received first scroll command. If scrolling is not completed, processing may return to step 415 and another additional list item may be added to the list view. If scrolling is completed, processing ends.

If, on the other hand, the additional list item does satisfy the breakpoint rule, processing may proceed to step 425. In step 425, the computing device may suspend or terminate a response to the scrolling action associated with the first scroll command. The computing device may effect the suspension or termination of the scrolling action in a variety of ways. For example, in some embodiments the computing device may stop updating list view responsive to the first scroll command after the additional list item is included in the list view. In other embodiments, the computing device may provide a "peek" of one or more content items following the breakpoint (the additional list item), and then snap or bounce the list view back to the breakpoint content item. The peek may include at least a portion of the one or more content items following the additional list item. This may be useful to indicate to the user that additional data follows the breakpoint content item.

After providing the "peek" or preview of the one or more list items following the breakpoint content item (the additional list item) in the scrollable list, the computing device may update the list view to remove the list items following the breakpoint. In some embodiments, the computing device may update the list view to scroll back to the additional list item, such that the one or more list items following the additional list item are no longer included in the list view. In some embodiments, a snap-back or a bounce-back animation may be used to present the operation to the user. The computing device may update the list view to provide a preview of the one or more list items following the additional list item based on the computing device continuing to receive user input associated with the first scroll command, such as where the user continues to drag upwards without removing their finger or stylus. Once user input associated with the first scroll command ends, in some embodiments, the list view may snap back to the breakpoint content item. This may provide a fluid and dynamic response to the first scroll command.

At step 435, the computing device may determine whether a second scroll command is received. If a second scroll command is not received, processing ends. If a second scroll command is received, the computing device may return to step 415 and scroll through the one or more items following the additional list item. Similar to the processing in response to the first scroll command, the computing device will scroll through the list items in the scrollable list until it identifies a list item that satisfies a breakpoint rule, at which point updates based on the second scroll command may be suspended.

The computing device may store the scrollable list, such as in memory 110. In some embodiments, the computing device may retrieve the scrollable list from a server prior to executing the steps illustrated in FIG. 4. The stored and/or retrieved scrollable list may include content items of the first portion of the scrollable list as well as the additional list item (the breakpoint content item) and one or more additional content items following the breakpoint content item in the scrollable list. That is, in some embodiments the computing device may retrieve the entire scrollable list prior to the steps illustrated in FIG. 4, or the computing device may retrieve a sufficient portion of the scrollable list to enable the computing device to display a significant portion of the scrollable list (including at least the first portion of the list, the additional list item, and one or more further list items following the additional list item) without having to retrieve additional portions of the scrollable list. In some embodiments, the retrieved and/or stored scrollable list may include more than one content item occurring before the breakpoint content item as well as more than one content item occurring after the breakpoint content item. Thus, the user may scroll through the scrollable list without having to wait for the computing device to retrieve additional portions of the scrollable list.

Figure 5:
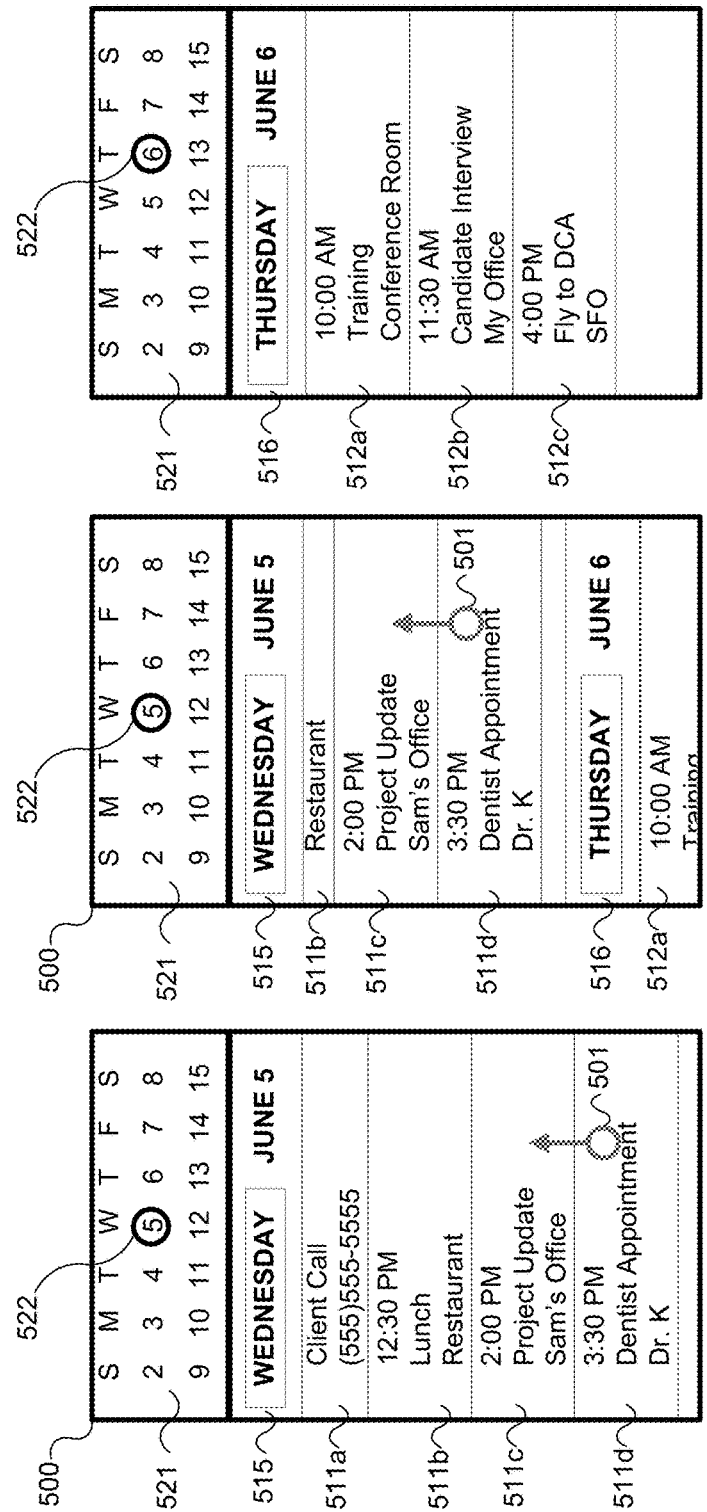
FIGS. 5A-5C depict example user interfaces as well as the operation of such user interfaces in accordance with one or more illustrative aspects discussed herein.

Having discussed a method for providing snap navigation in a scrollable list as shown in FIG. 4, discussion will now turn to FIGS. 5A-5C which illustrate an example of how a user may scroll past a content item identified as a breakpoint in some embodiments.

FIG. 5A illustrates an example user interface 500, which may generally correspond to user interface 300 (FIGS. 3A-3C). User interface 500 may include calendar items 511a-d (which may correspond to calendar items 311b-e) and heading 515 (which may correspond to heading 315). User interface 500 may further include an index through date picker 521 and indicator 522 (which may correspond to index portion 220, date picker 221, and indicator 222 of FIG. 2). User interface 500 may present content items of a scrollable list, and the content items may be grouped according to one or more criteria. For example, the content items may be calendar items and they may be grouped based on a date associated with the calendar item.

Calendar item 511d may correspond to a last event of the particular date displayed on the list view. More generally, calendar item 511d may be determined to correspond to an end of a logical grouping in the scrollable list. User interface 500 may have been updated to scroll through a scrollable list of content items, and the scrolling may have been suspended based on an inclusion of calendar item 511d on user interface 500, as explained above in regard to FIGS. 3A-3C and 4. As described above in regard to step 435 of FIG. 4, after response to a first scroll command has been suspended, a computing device may receive a second scroll command. For example, the computing device may receive second user input 501, corresponding to a second scroll command. The computing device may respond to the second scroll command by continuing to scroll the list view through the scrollable list, past the breakpoint content item identified as part of the response to the first scroll command.

As shown in FIG. 5B, the computing device may update the list view to include one or more content items of a logical grouping following the breakpoint content item, such as calendar item 512a. In the specific example illustrated in FIG. 5B, the breakpoint content item may be calendar item 511d which is associated with the date June 5. The logical grouping following the date June 5 may be content items associated with the date June 6, including calendar item 512a. The list view may also be updated to include an additional heading such as heading 516 related to a logical group of the content items following the breakpoint content item. The list view may be updated to scroll through the items of the logical grouping following a logical grouping of the breakpoint content item based on the second scroll command.

In some embodiments, the computing device may determine whether a magnitude or distance associated with the second scroll command is greater than a defined threshold value. If the magnitude is less than the threshold value, then user interface 500 may snap the list view back to display the breakpoint content item and its associated logical grouping and remove the one or more content items following the breakpoint from the list view. For example, user interface 500 may revert to that shown in FIG. 5A based on the computing device determining that the magnitude of the second scroll command does not exceed the threshold. Similar to the techniques discussed above, the list view may be updated to show the one or more items and then the list view may snap or bounce back to the breakpoint content item.

If the magnitude or distance of the second scroll command is greater than, or equal to, the defined threshold value, the computing device may update the list view to include additional content items of the logical grouping following the breakpoint content item. This is illustrated in FIG. 5C. For example, user interface 500 may be updated to include calendar item 512a of the logical grouping "June 6." User interface 500 may be updated to include further content items such as calendar items 512b and 512c, included in the same logical grouping as calendar item 512a. In some embodiments, the computing device may respond to the second scroll command by snapping the list view forward to display at least a portion of the logical grouping after the breakpoint and removing the logical grouping associated with the breakpoint. In the specific example illustrated in FIG. 5C, calendar items 511b-d associated with the grouping "June 5" have been removed and calendar items 512a-c associated with the grouping "June 6" are presented on the list view.

FIG. 5C also illustrates indicator 522 updated to indicate a next portion of date picker 521. In FIGS. 5A and 5B, where calendar items 511a-d were included in the list view, the index indicated June 5 as the current logical segment with indicator 522 on June 5 in date picker 521. In FIG. 5C, after user interface 500 has been updated to present calendar items associated with June 6, the computing device may update the index portion to indicate June 6 as the current logical segment by moving indicator 522 to June 6 in date picker 521. Accordingly, the index portion of user interface 500 may be updated based on scrolling activity in the list view portion.

Figure 6:
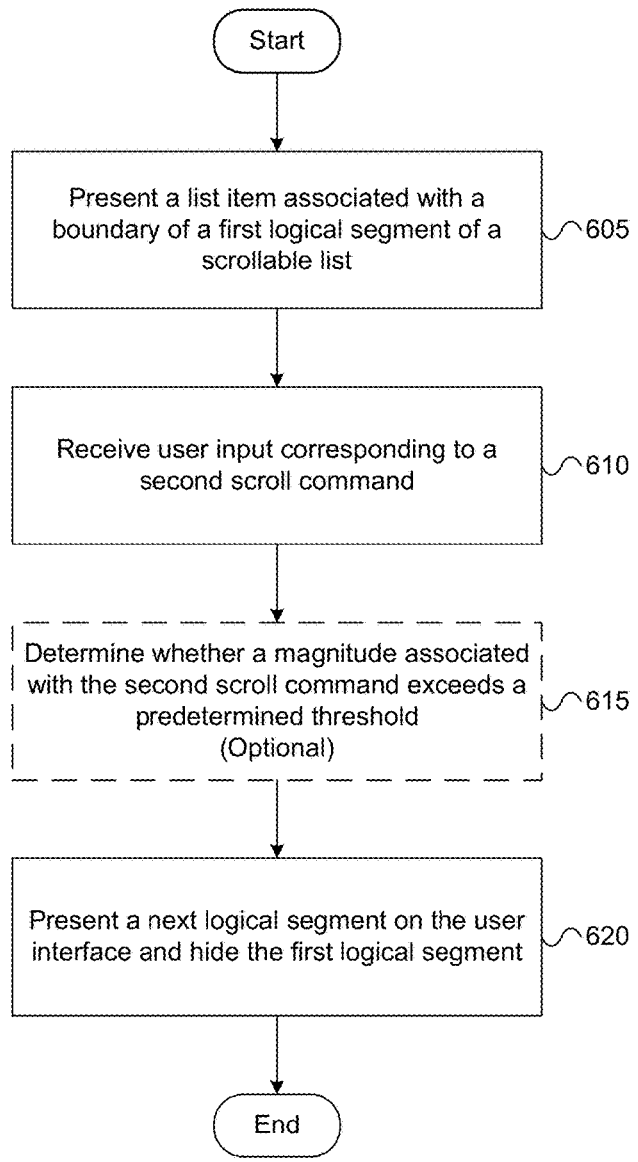
FIG. 6 depicts a flowchart that illustrates a method of navigating a scrollable list in accordance with one or more illustrative aspects discussed herein.

FIG. 6 illustrates a method of providing snap navigation in a scrollable list by snapping forward to a next logical segment in accordance with one or more illustrative aspects discussed herein, similar to the features discussed above in regard to FIGS. 5A-5C. In one or more embodiments, the method illustrated in FIG. 6 and/or one or more steps thereof may be performed by a computing device (e.g., generic computing device 100). Additionally or alternatively, the method illustrated in FIG. 6 and/or one or more steps thereof may, in some instances, be performed by a mobile device (which may implement one or more aspects of a computing device, such as generic computing device 100). In other embodiments, the method illustrated in FIG. 6 and/or one or more steps thereof may be embodied in computer-executable instructions that are stored in a computer-readable medium, such as a non-transitory computer-readable memory.

As illustrated in FIG. 6, the method may begin at step 605 in which the computing device may generate and/or provide a user interface including a list view of a scrollable list. The list view may present a first portion of a plurality of list or content items in the scrollable list. The user interface and the list view may be similar to user interface 500 (FIG. 5A), for instance, and the first portion of the plurality of list or content items in the scrollable list may be similar to calendar items 511a-d. The user interface may include a list item associated with a boundary of a first logical segment of the scrollable list. In the example of FIGS. 5A-5C, the list item may be calendar item 511d and the first logical segment may be the date "June 5."

In step 610, the computing device may receive user input corresponding to a second scroll command. The second scroll command may, in some embodiments, be received by the computing device after the computing device has suspended a response to a first scroll command, as explained above in regard to FIGS. 3A-3C and 4. As described above in regard to step 435 of FIG. 4, after response to a first scroll command has been suspended, a computing device may receive a second scroll command. The second scroll command may be received by the computing device while the list item associated with the logical boundary is included in the list view.

In step 615, the computing device may optionally determine whether a magnitude or distance associated with the second scroll command exceeds a predetermined threshold value. If the magnitude does not exceed the threshold value, the computing device may provide a peek of the next logical segment in the list view, but the list view may be updated to snap back to the boundary list item and the first logical segment. If the magnitude does exceed the threshold, the computing device may proceed to step 620. In some embodiments, step 615 is omitted and the computing device may proceed to step 620 after completing step 610.

In step 620, the computing device may update the list view to present a next logical segment of the scrollable list. The list view may be updated to include at least a portion of the content items included in the next logical segment of the scrollable list. In the example of FIGS. 5A-5C, the list view may be updated to present calendar items 512a-c. The computing device may further update the list view to remove list items associated with the first logical segment, including the boundary item. In the example of FIGS. 5A-5C, calendar items 511a-d have been removed from the list view after it snaps forward as shown in FIG. 5C. The computing device may animate the list view to snap forward to the next logical segment in the scrollable list.

Figure 7:
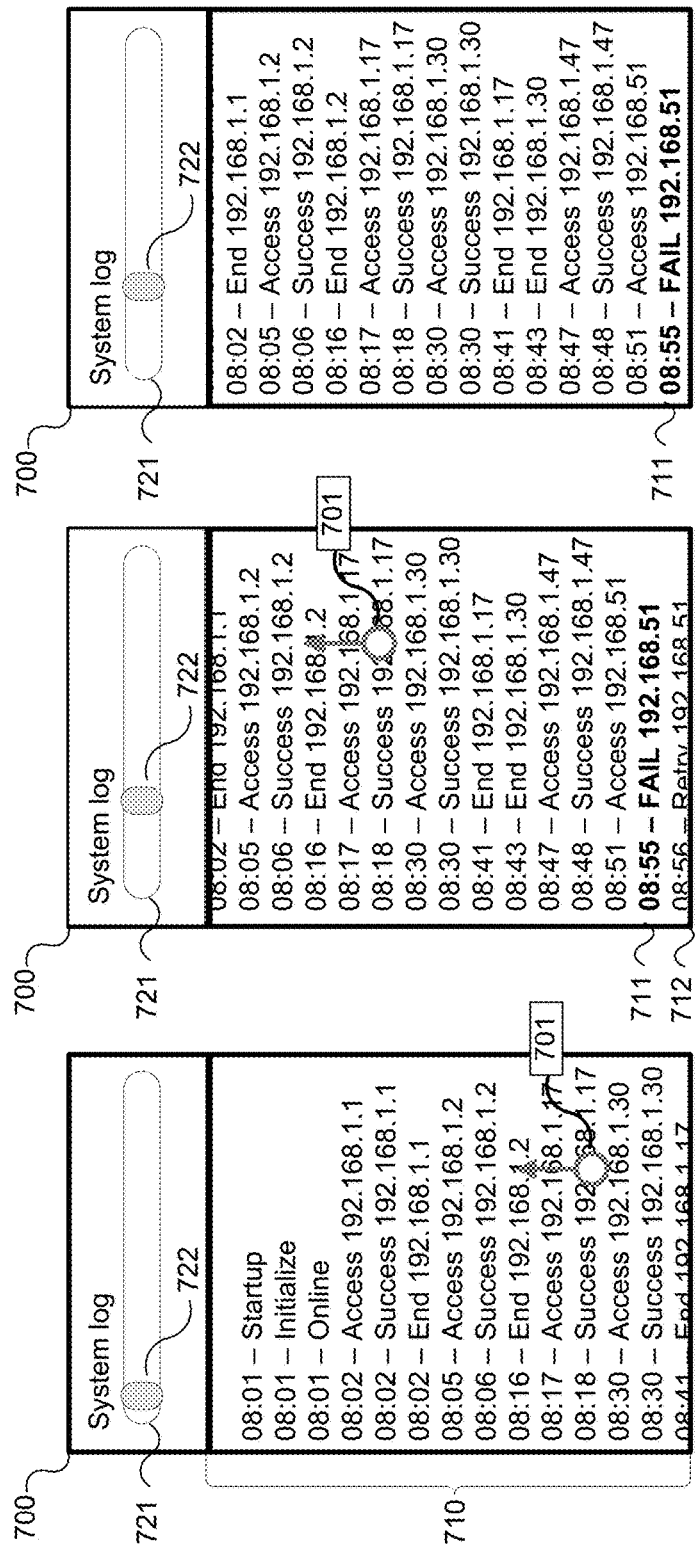
FIGS. 7A-7C depict other example user interfaces as well as the operation of such other user interfaces in accordance with one or more illustrative aspects discussed herein.

Having discussed methods of providing snap navigation in a scrollable list as illustrated in FIGS. 4 and 6, and examples of user interfaces related to a calendar application in FIGS. 2, 3A-C, and 5A-C, discussion will now turn to another example application of snap navigation in a scrollable list as shown in FIGS. 7A-7C.

FIGS. 7A-7C illustrate snap navigation in an event log according to one or more aspects disclosed herein. FIG. 7A illustrates an example user interface 700 for navigating through a scrollable event log. User interface 700 may be generated by a computing device, such as computing device 100. The event log may comprise a list view 710 presenting a scrollable list of event records. In the specific example of FIG. 7A, the event log may correspond to an access log for an electronic resource. Each event record may have associated content data and/or one or more attributes. For example, event records illustrated in FIG. 7A may have an event time, an event type, and an address.

Also illustrated in FIG. 7A is an index comprising progress bar 721 and indicator 722. Progress bar 721 and indicator 722 may indicate to a user substantially what portion of the scrollable list is included in list view 710. For example, in FIG. 7A, indicator 722 is at the beginning of progress bar 721, indicating that the list view includes event records from the beginning of the event log. By contrast, in FIG. 7C indicator 722 has moved further along progress bar 721, indicating that list view 710 includes event records from about a quarter of the way through the event log.

FIG. 7A depicts user input 701. User input 701 may correspond to a scrolling motion, and the computing device may respond to user input 701 similarly to that discussed above in regard to FIGS. 3A-3C. For example, user input 701 may comprise a user touching a touchscreen of the computing device and dragging their finger in an upward direction. As another example, user input 701 may comprise a user operating a pointing device or otherwise interacting with a scrollbar associated with list view 710. As yet another example, user input 701 may comprise operation of a physical or software button or key associated with scrolling, such as a scroll wheel or arrow key.

In response to receiving user input 701, the computing device may update list view 710 to scroll through the event log by updating list view 710 to include additional event records of the event log. For example, list view 710 may be updated to include additional event record 711 as illustrated in FIG. 7B. Additional event record 711 may be a content item in the scrollable list that follows, precedes, and/or is subsequent to an event record previously included in list view 710, based on a direction associated with user input 701. For example, event record 711 of FIG. 7B may occur later in time after one or more event records included in list view 710 of FIG. 7A. An order of items in the scrollable list may be determined by any suitable criteria based content data and/or attributes of the content items, such as in chronological order, alphabetical order, ordering based on data categories, creation order, specified ordering, user-defined order, and/or any appropriate criteria for determining an order of the content items in the scrollable lists. Responsive to receiving user input 701, list view 710 may be updated to include additional event record 711.

The computing device may determine whether event record 711 satisfies a breakpoint rule. If event record 711 satisfies the breakpoint rule, the computing device may suspend scrolling action that is based on user input 701, and list view 710 may stop scrolling at event record 711 until further input is received. Determining whether a content item satisfies a breakpoint rule may be based on any suitable criteria for identifying the content item as a breakpoint for scrolling the list. In some embodiments, the breakpoint rule may be based on whether content and/or attributes of the content item meet some breakpoint criteria. In the example of FIGS. 7A-7C, where the scrollable list comprises an event log, the breakpoint rule may be based on whether the content item is a critical or specified event. In the context of an electronic resource access log, a critical event may be a FAIL event where a user is unable to access the electronic resource. As another example, the breakpoint rule may be based on whether an importance attribute of the content item meets a threshold importance level. Event records in the event log may have an importance level attribute. In the context of an electronic resource access log, events may be classified based on their significance. For example, an access event may have a low significance, but a FAIL event may have a high significance. As yet another example, the breakpoint rule may be based on whether the content of the content item includes keywords or otherwise matches predefined and/or user defined criteria. For example, a rule may specify that events with content matching "FAIL" should be deemed breakpoints.

Based on determining that the event record satisfies a breakpoint rule, the computing device may suspend or terminate a response to the scrolling action associated with user input 701. As discussed above in regard to FIGS. 3A-3C, the computing device may effect the suspension or termination of the scrolling action in a variety of ways. In some embodiments, the computing device may stop updating list view 710 responsive to user input 701 after event record 711 is included in the list view 710. In other embodiments, the computing device may provide a "peek" of one or more event records following the breakpoint event record 711, and then snap or bounce list view 710 back to the breakpoint event record. As illustrated in FIG. 7B, the computing device may update list view 710 to provide a preview of one or more additional event records following the breakpoint event record in the event log, such as event record 712. As illustrated in FIG. 7B, event record 712 may be at least partially included in list view 710. This may be useful to indicate to the user that additional data follows the breakpoint event record. After providing the "peek" or preview of one or more additional event records (e.g., event record 712) following the breakpoint content item (e.g., event record 711) in the scrollable list, list view 710 may be updated to remove the additional event records. In some embodiments, the computing device may update list view 710 to scroll back to event record 711, such that event record 712 is no longer included in list view 710. In some embodiments, a snap-back or a bounce-back animation may be used to present the operation to the user.

FIG. 7C illustrates user interface 700 after a response to user input 701 has been suspended or terminated. List view 710 may be scrolled back or otherwise set to include event record 711 and remove event record 712. As a result of user input 701, the computing device has updated list view 710 to scroll through the event log on include event record 711. Thus, a response to a user's scrolling action may result in scrolling through a list until a breakpoint is reached. The response to the scrolling action may be stopped based on recognizing the breakpoint. This may improve a user's experience and comprehension when scrolling through a scrollable list of content items. As noted above, FIG. 7C also illustrates an updated indicator 722 on progress bar 721 to illustrate to a user where the current scroll position is located within the event log.

Figure 8:
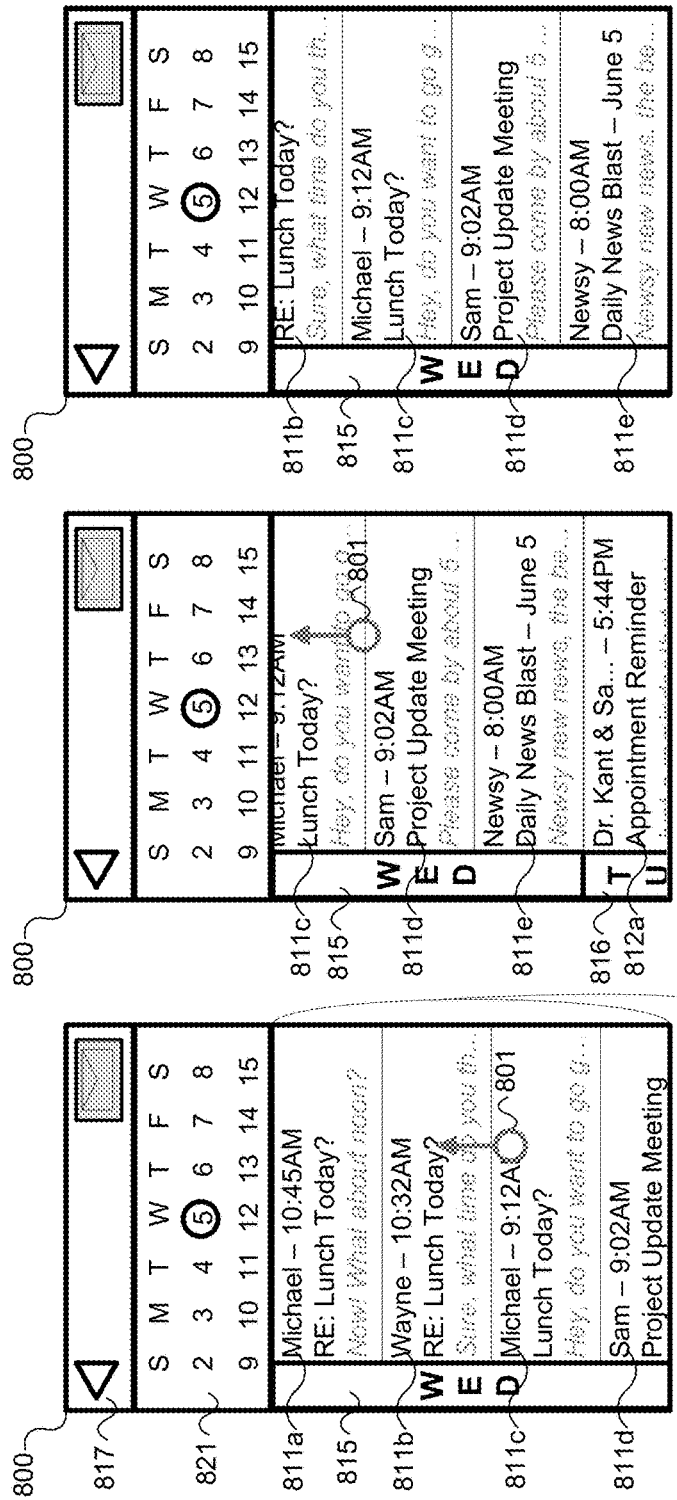
FIGS. 8A-C depict other example user interfaces as well as the operation of such other user interfaces in accordance with one or more illustrative aspects discussed herein.

Having discussed an example application of snap navigation in an event log, discussion will now turn to another example application of snap navigation in an email client, as illustrated in FIGS. 8A-8C.

FIGS. 8A-8C illustrate snap navigation in an email client according to one or more aspects disclosed herein. FIG. 8A illustrates an example user interface 800 for navigating through a scrollable list of emails. The emails in the list of emails may correspond to email messages in a user's email account. User interface 800 may be generated by a computing device, such as computing device 100. The email client may comprise a list view 810 presenting a scrollable list of emails grouped by date, sender, category, and/or other criteria. The user may scroll through the list of emails, and the scrolling may halt at boundaries between groups of emails, such as when a first email received on a given date or a last email from a particular sender is reached in the list view.

List view 810 may include one or more information items associated with each email included on list view 810. For example, emails illustrated in FIG. 8A may have a sender, a message time, and a message included in list view 810. User interface 800 may be configured to respond to a user selection of an email in list view 810 by opening the email message for the user. User interface 800 may further comprise application controls 817, operable to allow a user to send a message, access a menu, and the like. User interface 800 may optionally include date picker 821 and/or other index.

As illustrated in FIG. 8A, list view 810 may display a portion of a user's emails. For example, FIG. 8A illustrates emails 811a, 811b, 811c, 811d, and 811e as included in list view 810. A heading may be included to indicate a logical grouping of the scrollable list, such as heading 815 which indicates that the emails were sent on Wednesday. Each of emails 811a-e may have been sent on Wednesday, June 5, as indicated by date picker 821. In this particular example, heading 815 has been shortened to include a minimum amount of information needed to indicate the logical grouping to the user.

FIG. 8A depicts user input 801. User input 801 may correspond to a scrolling motion, and the computing device may respond to user input 801 similarly to that discussed above in regard to FIGS. 3A-3C. In response to receiving user input 801, the computing device may update list view 810 to scroll through the list of emails by updating list view 810 to include additional emails of the list of emails. For example, list view 810 may be updated to include additional email 811e as illustrated in FIG. 8B. Additional email 811e may be an email in the list of emails that follows, precedes, and/or is subsequent to email 811d already included in list view 810, based on a direction associated with user input 801. For example, email 811e of FIG. 8B may have been received before email 811d. Responsive to receiving user input 801, list view 810 may be updated to include additional email 811e.

The computing device may determine whether email 811e satisfies a breakpoint rule. If email 811e satisfies the breakpoint rule, the computing device may suspend scrolling action that is based on user input 801, and list view 810 may stop scrolling at email 811e until further input is received. In the example of FIGS. 8A-8C, where the scrollable list comprises a list of emails, the breakpoint rule may be based on whether the email corresponds to a first received or a last received email of a day. As discussed above in regard to FIGS. 3A-3C, the computing device may effect the suspension or termination of the scrolling action in a variety of ways. In some embodiments, the computing device may provide a "peek" of one or emails following the breakpoint email 811e, and then snap or bounce list view 810 back to the breakpoint event record. As illustrated in FIG. 8B, the computing device may update list view 810 to provide a preview of one or more additional emails following the breakpoint email 811e in the list of emails, such as email 812a. As illustrated in FIG. 8B, email 812a may be at least partially included in list view 810. An additional header may be included to indicate a logical grouping associated with the emails in the peek, such as heading 816 indicating that email 812a was received on Tuesday. This may be useful to indicate to the user that additional data follows the breakpoint email. After providing the "peek" or preview, list view 810 may be updated to remove the additional emails (e.g., email 812a). In some embodiments, the computing device may update list view 810 to scroll back to email 811e, such that email 812a is no longer included in list view 810. In some embodiments, a snap-back or a bounce-back animation may be used to present the operation to the user.

FIG. 8C illustrates user interface 800 after a response to user input 801 has been suspended or terminated. As a result of user input 801, the computing device has updated list view 810 to scroll through the list of emails to include email 811e, and email 811a has been removed as it has been scrolled off a top of list view 810.

Figure 9:
FIG. 9 depicts an example computing device and an example user interface in accordance with one or more illustrative aspects discussed herein.

FIGS. 2, 3A-3C, 5A-5C, 7A-C, and 8A-8C each illustrate examples of user interfaces 200, 300, 500, 700, and 800 which may be used to provide snap navigation of a scrollable list. As discussed above, computing device 100 may generate the user interface. The user interface may be presented to a user through input/output interface 135 (FIG. 1), such as through a display attached to or incorporated in computing device 100. FIG. 9 provides an example of a computing device, such as mobile device 900, displaying an example user interface 901 to a user on a screen associated with mobile device 900. Mobile device 900 may be a smart phone and may run a mobile operating system. User interface 901 may be adapted to support navigation by a user of mobile device 900, such as by mobile device 900 placing elements on user interface 901 to facilitate navigation using one hand.

As discussed above, numerous other applications are contemplated for the methods of providing snap navigation of a scrollable list disclosed herein. For example, the content items of the scrollable list may be task items and the list view may be part of a task list application. The list view may present tasks grouped by project, reviewer, date, and/or other criteria. The user may scroll through the task list, and the scrolling may halt at boundaries between groups of tasks, such as when a final task of a particular project is reached in the list view. Additionally and/or alternatively, scrolling may stop at a critical task or an overdue task, for example.

As another example, the content items of the scrollable list may be messages or content from a content stream such as a social media service. The list view may present messages grouped by date, sender, topic, and/or other criteria. The user may scroll through the messages, and the scrolling may halt at boundaries between groups of messages, such as an end of messages received on a particular date. Or, for example, the scrolling may halt at messages specifically directed at the user or mentioning the user by name.

One or more aspects of the disclosure may allow users to flick or scroll their way through a list of content items in logical segments, such as a list of events for a given day. If the list of items for a particular logical segment is long, the user may scroll to the end of segment easily without overshooting the end of the segment and advancing into the next. For example, a user may jump to the end of a day without accidentally advancing to the next day. Similarly, users may easily jump to the beginning of a logical segment without entering a previous segment. Aspects of the disclosure may provide a functional way to navigate through a list. As discussed above, a computing device may have stored or may retrieve a scrollable list including a plurality of content items. A user may then scroll throughout the stored scrollable list and the computing device may halt the scrolling at natural breakpoints in the stored scrollable list before advancing further into the list. This breakpoint-based scrolling may force a user to navigate one section of the scrollable list at a time, potentially providing a better user experience and improving comprehension of the presented information.

As illustrated above, various aspects of the disclosure relate to providing snap navigation in a scrollable list, particularly through identifying breakpoints in the scrollable list based on one or more breakpoint rules. Although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method comprising:
generating, by a computing device, a user interface presenting a list view of a scrollable list that includes a plurality of content items, the list view including a first portion of the plurality of content items, and the scrollable list being divided into a plurality of segments,
wherein each segment of the plurality of segments corresponds to a respective time period and the scrollable list is divided into the plurality of segments based on a date or time associated with each of the plurality of content items, and
wherein the list view is presented in a first region of the user interface and an index generated based on the plurality of content items of the scrollable list is presented in a second region of the user interface;
receiving, by the computing device, user input corresponding to a first scroll command;
based on the first scroll command, presenting, by the computing device, scrolling activity in the list view in the first region of the user interface by updating the list view in the first region of the user interface to scroll through the plurality of content items, thereby including a first additional content item of the plurality of content items in the list view;
updating, by the computing device, a user-selectable calendar date picker presented on the index in the second region of the user interface based on the scrolling activity in the list view in the first region of the user interface, wherein updating the user-selectable calendar date picker presented on the index in the second region of the user interface based on the scrolling activity in the list view in the first region of the user interface comprises updating the user-selectable calendar date picker presented on the index in the second region of the user interface to indicate a date associated with a segment of the plurality of segments being presented in the list view in the first region of the user interface as a result of the scrolling activity in the list view in the first region of the user interface;
determining, by the computing device, whether the first additional content item satisfies a breakpoint rule based on determining whether the first additional content item is a beginning item or an end item of a segment of the plurality of segments; and
when it is determined that the first additional content item satisfies the breakpoint rule, suspending further updates that are based on the first scroll command,
wherein the scrollable list includes a second additional content item following the first additional content item in a direction associated with the first scroll command.

2. The method of claim 1, comprising:
when it is determined that the first additional content item does not satisfy the breakpoint rule, updating the list view to continue scrolling through the plurality of content items, thereby including the second additional content item of the plurality of content items in the list view.

3. The method of claim 1, wherein suspending further updates based on the first scroll command comprises terminating the scrolling through the plurality of content items after the first additional content item is included in the list view.

4. The method of claim 1, wherein suspending further updates based on the first scroll command comprises updating, by the computing device, the list view to:
scroll past the first additional content item;
present at least a portion of the second additional content item of the plurality of content items; and
after presenting the portion of the second additional content item, cause the second additional content item to be automatically hidden by scrolling back to the first additional content item.

5. The method of claim 1, comprising:
receiving, by the computing device, user input corresponding to a second scroll command after suspending further updates based on the first scroll command and while the first additional content item is included in the list view; and
based on the second scroll command, updating, by the computing device, the list view to continue scrolling through the plurality of content items, thereby including the second additional content item of the plurality of content items in the list view,
wherein the second additional content item is adjacent to the first additional content item in the scrollable list.

6. The method of claim 1, wherein the breakpoint rule comprises a predefined value rule, and determining whether the first additional content item satisfies the breakpoint rule comprises determining whether a value associated with the first additional content item matches a predefined value or range of values.

7. The method of claim 1, comprising:
receiving, by the computing device, user input selecting the user-selectable calendar date picker presented on the index; and
based on the user input selecting the user-selectable calendar date picker presented on the index, updating, by the computing device, the user interface to present a second portion of the plurality of content items,
wherein the second portion of the plurality of content items is determined based on a date corresponding to the user input selecting the user-selectable calendar date picker presented on the index.

8. The method of claim 1, wherein the user interface further presents a user-selectable grouping control that is configured to allow a user of the computing device to group content items included in the scrollable list by day, week, or month.

9. The method of claim 1, comprising:
receiving, by the computing device, user input selecting a particular date in the user-selectable calendar date picker presented on the index; and
in response to receiving the user input selecting the particular date in the user-selectable calendar date picker presented on the index, causing, by the computing device, the list view to jump in the scrollable list to a portion of the scrollable list associated with one or more events occurring on the particular date.

10. A system comprising:
a processor; and
memory storing computer-readable instructions that, when executed by the processor, cause the system to:
generate a user interface presenting a list view of a scrollable list that includes a plurality of content items, the list view including a first portion of the plurality of content items, and the scrollable list being divided into a plurality of segments,
  wherein each segment of the plurality of segments corresponds to a respective time period and the scrollable list is divided into the plurality of segments based on a date or time associated with each of the plurality of content items, and
  wherein the list view is presented in a first region of the user interface and an index generated based on the plurality of content items of the scrollable list is presented in a second region of the user interface;
receive user input corresponding to a first scroll command;
based on the first scroll command, present scrolling activity in the list view in the first region of the user interface by updating the list view in the first region of the user interface to scroll through the plurality of content items, thereby including a first additional content item of the plurality of content items in the list view;
update a user-selectable calendar date picker presented on the index in the second region of the user interface based on the scrolling activity in the list view in the first region of the user interface, wherein updating the user-selectable calendar date picker presented on the index in the second region of the user interface based on the scrolling activity in the list view in the first region of the user interface comprises updating the user-selectable calendar date picker presented on the index in the second region of the user interface to indicate a date associated with a segment of the plurality of segments being presented in the list view in the first region of the user interface as a result of the scrolling activity in the list view in the first region of the user interface;
determine whether the first additional content item satisfies a breakpoint rule based on determining whether the first additional content item is a beginning item or an end item of a segment of the plurality of segments; and
when it is determined that the first additional content item satisfies the breakpoint rule, suspend further updates that are based on the first scroll command,
wherein the scrollable list includes a second additional content item following the first additional content item in a direction associated with the first scroll command.

11. The system of claim 10, wherein the memory stores additional computer-readable instructions that, when executed by the processor, cause the system to:
  when it is determined that the first additional content item does not satisfy the breakpoint rule, update the list view to continue scrolling through the plurality of content items, thereby including the second additional content item of the plurality of content items in the list view.

12. The system of claim 10, wherein suspending further updates based on the first scroll command comprises terminating the scrolling through the plurality of content items after the first additional content item is included in the list view.

13. The system of claim 10, wherein suspending further updates based on the first scroll command comprises updating the list view to:
  scroll past the first additional content item;
  present at least a portion of the second additional content item of the plurality of content items; and
  after presenting the portion of the second additional content item, cause the second additional content item to be automatically hidden by scrolling back to the first additional content item.

14. The system of claim 10, wherein the memory stores additional computer-readable instructions that, when executed by the processor, cause the system to:
  receive user input corresponding to a second scroll command after suspending further updates based on the first scroll command and while the first additional content item is included in the list view; and
  based on the second scroll command, update the list view to continue scrolling through the plurality of content items, thereby including the second additional content item of the plurality of content items in the list view,
  wherein the second additional content item is adjacent to the first additional content item in the scrollable list.

15. The system of claim 10, wherein the breakpoint rule comprises a predefined value rule, and determining whether the first additional content item satisfies the breakpoint rule comprises determining whether a value associated with the first additional content item matches a predefined value or range of values.

16. The system of claim 10, wherein the memory stores additional computer-readable instructions that, when executed by the processor, cause the system to:
  receive user input selecting the user-selectable calendar date picker presented on the index; and
  based on the user input selecting the user-selectable calendar date picker presented on the index, update the user interface to present a second portion of the plurality of content items,
  wherein the second portion of the plurality of content items is determined based on a date corresponding to the user input selecting the user-selectable calendar date picker presented on the index.

17. The system of claim 10, wherein the user interface further presents a user-selectable grouping control that is configured to allow a user of the system to group content items included in the scrollable list by day, week, or month.

18. One or more non-transitory computer readable media storing instructions that, when executed by a computing device, cause the computing device to:
  generate a user interface presenting a list view of a scrollable list that includes a plurality of content items, the list view including a first portion of the plurality of content items, and the scrollable list being divided into a plurality of segments,
    wherein each segment of the plurality of segments corresponds to a respective time period and the scrollable list is divided into the plurality of segments based on a date or time associated with each of the plurality of content items, and
    wherein the list view is presented in a first region of the user interface and an index generated based on the plurality of content items of the scrollable list is presented in a second region of the user interface;
  receive user input corresponding to a first scroll command;
  based on the first scroll command, present scrolling activity in the list view in the first region of the user interface by updating the list view in the first region of the user interface to scroll through the plurality of content items, thereby including a first additional content item of the plurality of content items in the list view;

update a user-selectable calendar date picker presented on the index in the second region of the user interface based on the scrolling activity in the list view in the first region of the user interface, wherein updating the user-selectable calendar date picker presented on the index in the second region of the user interface based on the scrolling activity in the list view in the first region of the user interface comprises updating the user-selectable calendar date picker presented on the index in the second region of the user interface to indicate a date associated with a segment of the plurality of segments being presented in the list view in the first region of the user interface as a result of the scrolling activity in the list view in the first region of the user interface;

determine whether the first additional content item satisfies a breakpoint rule based on determining whether the first additional content item is a beginning item or an end item of a segment of the plurality of segments; and when it is determined that the first additional content item satisfies the breakpoint rule, suspend further updates that are based on the first scroll command, wherein the scrollable list includes a second additional content item following the first additional content item in a direction associated with the first scroll command.

\* \* \* \* \*